(12) United States Patent
Ohtomo et al.

(10) Patent No.: US 8,908,156 B2
(45) Date of Patent: Dec. 9, 2014

(54) ELECTRO-OPTICAL DISTANCE MEASURING DEVICE

(75) Inventors: Fumio Ohtomo, Tokyo-to (JP); Kaoru Kumagai, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 651 days.

(21) Appl. No.: 12/984,975

(22) Filed: Jan. 5, 2011

(65) Prior Publication Data

US 2011/0169948 A1 Jul. 14, 2011

(30) Foreign Application Priority Data

Jan. 12, 2010 (JP) .................................. 2010-004235

(51) Int. Cl.
| | |
|---|---|
| G01S 17/66 | (2006.01) |
| G01S 17/36 | (2006.01) |
| G01S 17/32 | (2006.01) |
| G01S 17/46 | (2006.01) |
| G01S 17/88 | (2006.01) |
| G01S 17/89 | (2006.01) |

(52) U.S. Cl.
CPC ............... *G01S 17/36* (2013.01); *G01S 17/325* (2013.01); *G01S 17/89* (2013.01)
USPC ......... 356/4.1; 356/4.01; 356/4.06; 356/5.09; 356/5.11

(58) Field of Classification Search
CPC .. G01B 9/02; G01B 9/02002; G01B 9/02003; G01B 9/02007; G01B 9/02009; G01B 9/02041; G01S 17/08; G01S 17/10; G01S 17/102; G01S 17/32; G01S 17/325; G01S 17/36
USPC ..................................... 356/5.1; 348/E7.085
See application file for complete search history.

(56) References Cited

U.S. PATENT DOCUMENTS

2002/0180956 A1 * 12/2002 Barker .......................... 356/121
2004/0145723 A1 * 7/2004 Ohtomo et al. ............... 356/5.01
(Continued)

FOREIGN PATENT DOCUMENTS

| EP | 1903299 A1 | 3/2008 |
|---|---|---|
| JP | 5-134042 A | 5/1993 |

(Continued)

OTHER PUBLICATIONS

K. Liu, Y. Wang, D. Lau, Q. Hao, & L.G. Haddebrook, "Dual-frequency pattern scheme for high-speed 3-D shape measurement", 18 Optics Express 5229-5244 (Feb. 26, 2010).*

(Continued)

*Primary Examiner* — Dave Czekaj
*Assistant Examiner* — David N Werner
(74) *Attorney, Agent, or Firm* — Nields, Lemack & Frame, LLC (57) ABSTRACT

An electro-optical distance measuring device having a photodetection unit comprising a plurality of pixels arranged in a predetermined arrangement is disclosed. A signal processing unit has a storage unit for storing the detection result in correspondence with each of the pixels, wherein the signal processing control unit sequentially changes a position of the division for every cycle wave at which the photodetection amount is detected and continues detections until a detected range becomes at least one cycle or more. The arithmetic processing unit calculates a waveform for at least one cycle stored in the storage unit for each pixel, obtains a phase difference of the waveform with respect to the irradiated distance measuring light, and calculates the distance based on the phase difference.

5 Claims, 5 Drawing Sheets

(56) References Cited

U.S. PATENT DOCUMENTS

| | | | | |
|---|---|---|---|---|
| 2005/0275827 | A1* | 12/2005 | Mori et al. | 356/5.09 |
| 2008/0158359 | A1* | 7/2008 | Takeda | 348/148 |
| 2008/0231832 | A1* | 9/2008 | Sawachi | 356/5.1 |
| 2009/0190007 | A1 | 7/2009 | Oggier et al. | |
| 2012/0092644 | A1* | 4/2012 | Spruck et al. | 356/5.01 |

FOREIGN PATENT DOCUMENTS

| | | |
|---|---|---|
| JP | 6-160196 A | 6/1994 |
| JP | 2004-32682 A | 1/2004 |
| JP | 2004-45304 A | 2/2004 |
| JP | 2004-309310 A | 11/2004 |

OTHER PUBLICATIONS

Tepia/3D Incorporated/Matsushita Electric Works, Ltd./ Panasonic-Denko Co., "Range-Finding Image Sensor", 5 pgs. with English Translation (pp. 1-14), Oct. 21, 2008, 5 pages.

European Search Report dated Apr. 29, 2011 in corresponding foreign application EP 11150600.

IEEE Journal of Quantum Electronics, vol. 37, No. 3, Mar. 2001, p. 390-397, XP 011052593, "Solid-State Time-of-Flight Range Camera", Lange, et al.

* cited by examiner

ELECTRO-OPTICAL DISTANCE MEASURING DEVICE

BACKGROUND OF THE INVENTION

The present invention relates to an electro-optical distance measuring device capable of acquiring an image, and of measuring a distance to an object in the image and a three-dimensional shape of the object.

One of electro-optical distance measuring methods is a method to measure a distance by using a phase measurement. In this electro-optical distance measuring method, a high frequency light signal is irradiated to the object to be measured, a reflected from the object to be measured is converted into an electrical signal, a frequency of the electrical signal is converted to low frequency (i.e., beaten down) by a frequency converter of electronics, and the distance is measured by detecting a low frequency phase.

Feature of the electro-optical distance measuring method is to utilize a property that a high frequency phase is kept as a low frequency phase when the high frequency is down-converted. Thus, high resolution measurement is achieved.

However, for example, for measuring a three-dimensional shape of an object to be measured or for other purposes, it is necessary to measure distances with respect to as many as thousands or more points. In conventional electro-optical distance measuring method, a measurement is made for one point at a time and the measurement is made for each one point sequentially. Therefore, long time is required for the measurement. Or, even if a plurality of measuring devices are used, remarkable improvement cannot be expected in the measuring time.

SUMMARY OF THE INVENTION

It is an object of the present invention to provide an electro-optical distance measuring device capable of taking an image of an object to be measured, of acquiring image data about the object to be measured, of performing electro-optical distance measurement for each pixel in accordance with acquired image signal and of acquiring image data of the object to be measured and distance data for each pixel.

To attain the above object, the present invention provides an electro-optical distance measuring device, comprising a projection unit for modulating a distance measuring light to a predetermined frequency and for irradiating the modulated light toward an object to be measured, a photodetection unit for receiving a reflected distance measuring light from the object to be measured, a signal processing unit for storing a photodetection signal from the photodetection unit, an arithmetic processing unit for calculating a distance to the object to be measured based on the photodetection signal stored in the signal processing unit, and a signal processing control unit for controlling the photodetection unit and the signal processing unit and for acquiring the photodetection signal in order to calculate the distance for each pixel, wherein the photodetection unit comprises a plurality of pixels arranged in a predetermined arrangement and an output unit being provided corresponding to each of the pixels, for accumulating the photodetection signal from each of the pixels, for detecting a photodetection amount of the photodetection signal corresponding to one division among divisions to which one cycle is divided by predetermined number and for outputting a detection result on the time series, wherein the signal processing unit has a storage unit for storing the detection result in correspondence with each of the pixels, wherein the signal processing control unit sequentially changes a position of the division for every cycle wave at which the photodetection amount is detected and continues detections until a detected range becomes at least for one cycle or more, and wherein the arithmetic processing unit calculates a waveform for at least one cycle wave based on the detection result of at least one cycle stored in the storage unit for each pixel, obtains a phase difference of the waveform with respect to the irradiated distance measuring light, and calculates the distance based on the phase difference.

Also, the present invention provides an electro-optical distance measuring device, comprising a means for generating a first frequency, a means for generating a second frequency adjacent to the first frequency, an irradiation means for irradiating a modulated light with the first frequency toward an object to be measured, a photodetection unit for receiving a light reflected from the object to be measured by a plurality of pixels arranged in a predetermined arrangement, a difference frequency generation means for modulating each of photodetection signals acquired from each of the plurality of pixels to the second frequency and for acquiring a difference frequency signal, which is a difference between the first frequency and the second frequency, in correspondence with each of the photodetection signals, a means for dividing a waveform of each of the difference frequency signals, for sequentially reading the difference frequency signals of divided positions as sampling data in accordance with an arrangement order of the pixels, for sequentially changing the reading of the divided positions for every cycle, and for repeatedly reading the divided positions for at least one cycle or more of the difference frequency signal, a means for obtaining the difference frequency signal based on the sampling data, and an arithmetic means for detecting a phase of the obtained difference frequency signal and for calculating a distance.

Also, the present invention provides an electro-optical distance measuring device, wherein the photodetection unit comprises a means for controlling electric charge generated in the pixels or accumulation of the electric charge generated accordingly, and for modulating the photodetection signal to the second frequency. Also, the present invention provides an electro-optical distance measuring device, wherein the cycle of the difference frequency signal acquired by the difference frequency generation means is set so as not to be an integral multiple of data acquisition cycle of a waveform of difference frequency, and the phase is measured according to the waveform data over a plurality of cycles of the difference frequency signal. Also, the present invention provides an electro-optical distance measuring device, further comprising a reference optical system, wherein a part of modulated light irradiating the object to be measured is guided to a part of the pixels of the photodetection unit by the reference optical system, a phase of difference frequency obtained via the reference optical system is regarded as a reference phase, a phase difference between a phase of difference frequency obtained based on a photodetection signal from the rest of pixels of the photodetection unit and the reference phase is determined and a distance is calculated based on the phase difference.

According to the present invention, an electro-optical distance measuring device comprises a projection unit for modulating a distance measuring light to a predetermined frequency and for irradiating the modulated light toward an object to be measured, a photodetection unit for receiving a reflected distance measuring light from the object to be measured, a signal processing unit for storing a photodetection signal from the photodetection unit, an arithmetic processing unit for calculating a distance to the object to be measured based on the photodetection signal stored in the signal processing unit, and a signal processing control unit for controlling the photodetection unit and the signal processing unit and for acquiring the photodetection signal in order to calculate the distance for each pixel, and the photodetection unit comprises a plurality of pixels arranged in a predetermined arrangement and an output unit being provided corresponding to each of the pixels, for accumulating the photodetection signal from each of the pixels, for detecting a photodetection amount of the photodetection signal corresponding to one division among divisions to which one cycle is divided by predetermined number and for outputting a detection result on the time series, and the signal processing unit has a storage unit for storing the detection result in correspondence with each of the pixels, and the signal processing control unit sequentially changes a position of the division for every cycle wave at which the photodetection amount is detected and continues detections until a detected range becomes at least for one cycle or more, and the arithmetic processing unit calculates a waveform for at least one cycle wave based on the detection result of at least one cycle stored in the storage unit for each pixel, obtains a phase difference of the waveform with respect to the irradiated distance measuring light, and calculates the distance based on the phase difference. As a result, a distance to each of the pixels constituting the image can be measured and a three-dimensional shape of the object to be measured can be measured at the time of the acquisition of the image of the object to be measured.

Also, according to the present invention, an electro-optical distance measuring device comprises a means for generating a first frequency, a means for generating a second frequency adjacent to the first frequency, an irradiation means for irradiating a modulated light with the first frequency toward an object to be measured, a photodetection unit for receiving a light reflected from the object to be measured by a plurality of pixels arranged in a predetermined arrangement, a difference frequency generation means for modulating each of photodetection signals acquired from each of the plurality of pixels to the second frequency and for acquiring a difference frequency signal, which is a difference between the first frequency and the second frequency, in correspondence with each of the photodetection signals, a means for dividing a waveform of each of the difference frequency signals, for sequentially reading the difference frequency signals of divided positions as sampling data in accordance with an arrangement order of the pixels, for sequentially changing the reading of the divided positions for every cycle, and for repeatedly reading the divided positions for at least one cycle or more of the difference frequency signal, a means for obtaining the difference frequency signal based on the sampling data, and an arithmetic means for detecting a phase of the obtained difference frequency signal and for calculating a distance. As a result, a distance to each of the pixels constituting the image can be measured and a three-dimensional shape of the object to be measured can be measured at the time of the acquisition of the image of the object to be measured.

Also, according to the present invention, in an electro-optical distance measuring device, the photodetection unit comprises a means for controlling electric charge generated in the pixels or accumulation of the electric charge generated accordingly, and for modulating the photodetection signal to the second frequency. As a result, the photodetection signals are acquired for all the pixels at the same time, no time delay occurs and no distance measurement error occurs among the pixels. Thus, no distortion of the image is caused.

Also, according to the present invention, an electro-optical distance measuring device further comprises a reference optical system, and a part of modulated light irradiating the object to be measured is guided to a part of the pixels of the photodetection unit by the reference optical system, a phase of difference frequency obtained via the reference optical system is regarded as a reference phase, a phase difference between a phase of difference frequency obtained based on a photodetection signal from the rest of pixels of the photodetection unit and the reference phase is determined and a distance is calculated based on the phase difference. As a result, effects of, for example, drifts in the photodetection unit and an internal circuit of the electro-optical distance measuring device are offset and thereby accuracy of measurement is improved.

DETAILED DESCRIPTION OF THE PREFERRED EMBODIMENTS

Hereinafter, embodiments of the present invention will be described with reference to the drawings.

Figure 1:
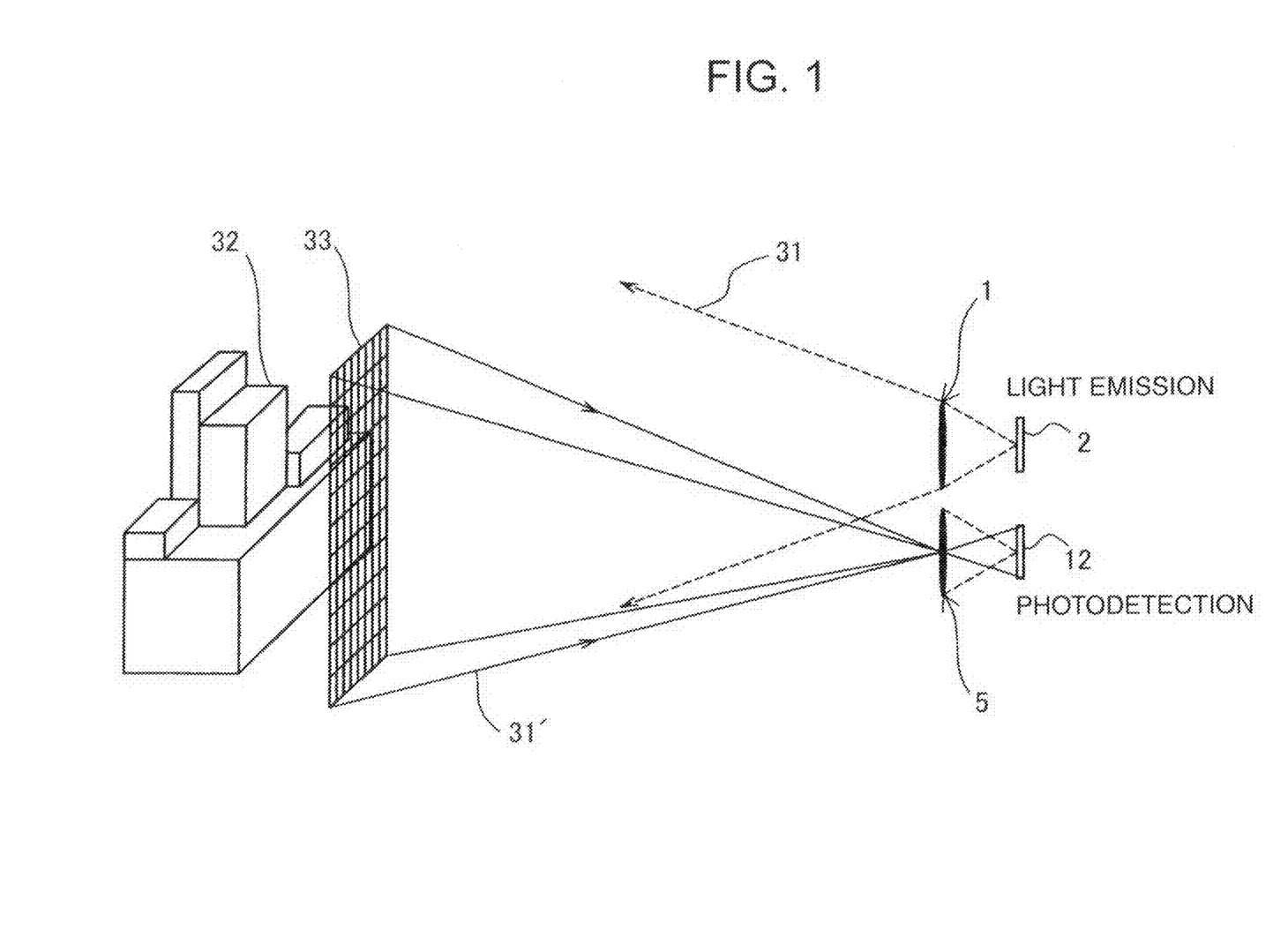
FIG. 1 is a drawing to show a concept of the present invention.
Figure 2:
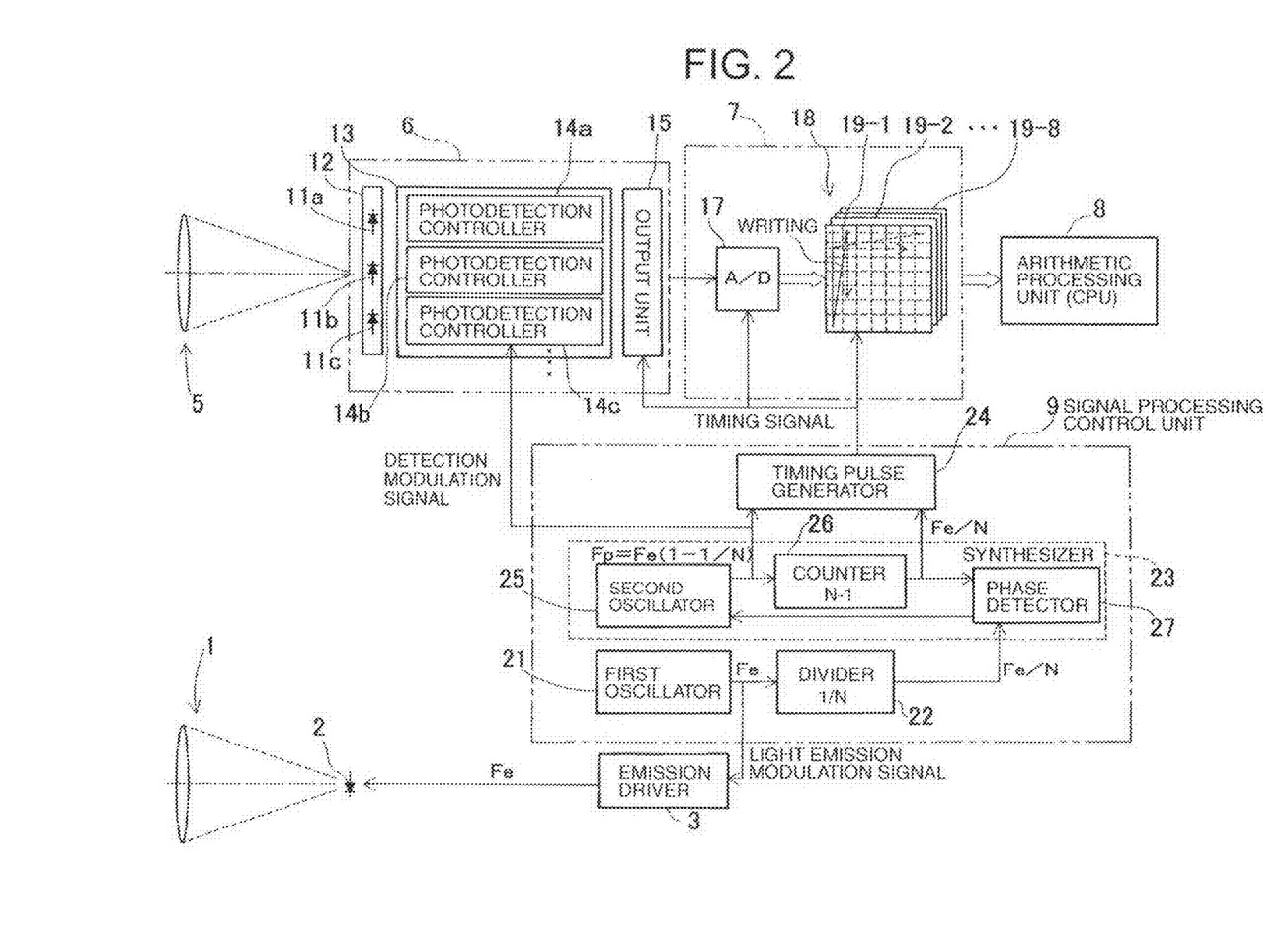
FIG. 2 is a schematic block diagram of a first embodiment of the present invention.

FIG. 1 is a drawing to show a concept of the present invention. FIG. 2 is a schematic block diagram of an electro-optical distance measuring device according to a first embodiment of the present invention.

In FIG. 1, reference numeral 1 denotes a projecting optical system, 2 denotes an emitting element, 5 denotes a photodetecion optical system and 12 denotes a photodetection element. A laser beam emitted from the emitting element 2 is irradiated as distance measuring light 31 toward an object to be measured 32 via the projecting optical system 1. A reflected distance measuring light 31' reflected from the object to be measured 32 is received by the photodetection element 12 via the photodetection optical system 5.

The photodetection element 12 is an array sensor having multiple pixels arranged in a matrix. A grating 33 illustrated in FIG. 1 is a virtual surface corresponding to a photodetection surface of the photodetection element 12. Each grid of the grating 33 corresponds to a pixel of the photodetection element 12.

In FIG. 2, the components equivalent to components in FIG. 1 are denoted by the same reference numerals. Reference numeral 1 denotes a projecting optical system, 2 denotes an emitting element, such as a laser diode, 3 denotes an emission driver which drives the emitting element 2 to emit light, 5 denotes a photodetection optical system, 6 denotes a photodetection unit, 7 denotes a signal processing unit, 8 denotes an arithmetic processing unit (CPU) and 9 denotes a signal processing control unit.

The emission driver 3 drives the emitting element 2 based on the emission frequency Fe which is output from the signal processing control unit 9. A laser beam modulated by the emission frequency Fe is irradiated from the emitting element 2.

The photodetection unit 6 has a photodetection element 12, a photodetection control unit 13 and an output unit 15. The photodetection element 12 consists of pixels 11a, 11b, 11c, . . . and 11n (hereinafter, referred to as a pixel 11 as a collective name). The photodetection element 12 is an array sensor having the pixels 11a, 11b, 11c, . . . and 11n arranged in a matrix. Each photodetection element 12 converts a photodetection amount into electrical signal (i.e., electric charge) and output the electrical signal. Positions of the pixels 11 on the photodetection element 12 can be specified.

The photodetection control unit 13 comprises photodetection controllers 14a, 14b, 14c, . . . and 14n (hereinafter, referred to as a photodetection controller 14 as a collective name) each corresponding to the pixels 11a, 11b, 11c, . . . and 11n respectively. Each photodetection controller 14 modulates (i.e., beats down) the photodetection signal from the corresponding pixel 11, based on a detection modulation signal (described later), from the frequency of the photodetection signal to the frequency Fp, which is a difference frequency. The photodetection controller 14 then outputs the photodetection signal.

Further, the output unit 15 sequentially outputs the photodetection signals modulated by the photodetection controllers 14a, 14b, 14c, . . . and 14n in a predetermined order based on timing signals issued by the signal processing control unit 9. That is, the output unit 15 sequentially outputs the signals for a frame received by the photodetection element 12 in a predetermined order for every frame.

The signal processing unit 7 has an A/D signal processing unit 17 and a storage unit 18. The A/D signal processing unit 17 performs an A/D conversion of the photodetection signals from the output unit 15. The A/D signal processing unit 17 correlates the converted photodetection signals with each of the pixels 11 based on the timing signal from the signal processing control unit 9. The A/D signal processing unit 17 associates the photodetection signal with a phase angle (described later) at the time when the photodetection signal is detected and writes the photodetection signal to predetermined address of the storage unit 18.

The storage unit 18 has a necessary number of frame memories 19, each of which corresponds to a frame of the photodetection element 12. For example, the storage unit 18 has the frame memories 19 in a number corresponding to the number of divided sections in one cycle of modulation frequency, which will be described later. For example, if the one cycle is divided into eight sections, the storage unit 18 has at least eight frame memories 19.

The arithmetic processing unit 8 calculates a distance based on every photodetection signal, which is stored in the same address of frame memories 19-1 to 19-8 among the photodetection signals stored in the frame memories 19-1 to 19-8. That is, the arithmetic processing unit 8 calculates the distances with respect to all the pixels 11a, 11b, 11c, . . . and 11n.

The signal processing control unit 9 controls light emission and irradiation of the emitting element 2, a photodetection of the photodetection unit 6, a modulation of the photodetection signal and a writing to the storage unit 18 in the signal processing unit 7. The signal processing control unit 9 also performs synchronization control with respect to photodetection of the photodetection element 12 and signal processing, including input/output and processing of the photodetection signal. The signal processing control unit 9 comprises a first oscillator 21, a divider 22, a synthesizer 23 and a timing pulse generator 24. The first oscillator 21 issues a light emission modulation signal with light emission modulation frequency (Fe). The divider 22 issues division signal acquired by dividing the light emission modulation signal into a predetermined frequency (Fe/N).

The synthesizer 23 further comprises a second oscillator 25, a counter 26 and a phase detector 27. The second oscillator 25 issues a difference frequency signal with the frequency Fp (=Fe (1−1/N)).

The division signal from the divider 22 are input to the phase detector 27 and the phase detector 27 issues synchronization signal based on the division signal. In synchronization with the signal from the phase detector 27, the second oscillator 25 outputs, to the photodetection unit 6, a detection modulation signal with the modulated frequency Fp (=Fe (1−1/N)) which is equivalent to the difference frequency signal. The detection modulation signal from the second oscillator 25 is converted into feedback signal with the frequency Fe/N via the counter 26. The feedback signal is fed back to the phase detector 27. The detection modulation signal and the division signal are controlled to be in synchronization with each other.

From the synthesizer 23, the detection modulation signal with the frequency Fp and the division signal with the frequency Fe/N are input to the timing pulse generator 24. Based on the detection modulation signal and the division signal, the timing pulse generator 24 issues a timing signal for outputting the photodetection signal to the output unit 15, a timing signal for processing the signal to the A/D signal processing unit 17 and a timing signal for storaging the signals to the storage unit 18.

An operation of the present embodiment will be described with reference to FIGS. 3A to 3F.

From the projecting optical system 1, a laser beam (i.e., the distance measuring light 31) with the modulated frequency Fe is irradiated. The distance measuring light 31 reflected by the object to be measured 32 enters the photodetection element 12 as the reflected distance measuring light 31' (with the frequency Fe) via the photodetection optical system 5.

All the pixels 11a, 11b, 11c, . . . and 11n of the photodetection element 12 receive the reflected distance measuring lights 31' at the same time and output the photodetection signals at the same time. The output photodetection signals have the frequency Fe. Each of the photodetection controllers 14a, 14b, 14c, . . . and 14n of the photodetection control unit 13 beats the frequency Fe of the photodetection signal down to the frequency Fp based on the detection modulation signal with respect to the photodetection signals from each corresponding pixel 11a, 11b, 11c, . . . and 11n. Each of the photodetection controllers 14a, 14b, 14c, . . . and 14n detects the photodetection signals output from the pixels 11a, 11b, 11c, . . . and 11n in synchronization with the frequency (Fe/N) for only preset phase angle of one cycle wave. The detected signals are accumulated temporarily, respectively.

Figure 3A:
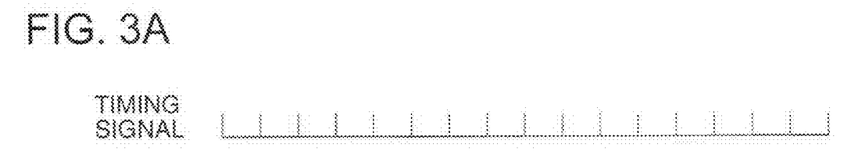
FIGS. 3A to 3F are illustrative drawings in a case where phase difference of reflected distance measuring light is obtained based on photodetection signals in the first embodiment.

Here, a range of the phase angle in which the photodetection signal is to be detected is, for example, a phase angle obtained by dividing one cycle into two sections, i.e., Π (see FIG. 3A).

The photodetection signals for all the pixels 11a, 11b, 11c, . . . and 11n, i.e., for one frame are detected and accumulated for only a predetermined phase angle of one cycle wave of the reflected distance measuring light 31'.

Although not illustrated in particular, the photodetection signal output from the photodetection element 12 is acquired also as image signal.

One cycle of the photodetection signal is divided by necessary numbers. The photodetection signal is detected at a one dividing position for a cycle wave. The photodetection signal is detected at an adjacent dividing position for next one cycle wave. The dividing position is changed sequentially for every wave. Detection is repeated such that the total detection range might be at least for one cycle. For further improving accuracy of measurement, detection is repeated for two, three or more cycles.

The photodetection signals from the pixels 11a, 11b, 11c, ... 11n are frequency-modulated and these photodetection signals are input to the output unit 15 in synchronization with the timing signals issued by the timing pulse generator 24. The output unit 15 outputs the photodetection signals to the A/D signal processing unit 17 on the time series in accordance with the addresses of the pixel 11. The A/D signal processing unit 17 performs an A/D conversion on the photodetection signals and addresses the signals in synchronization with the timing signals issued by the timing pulse generator 24. The photodetection signals are associated with n-th division of one cycle, e.g., the first division of one cycle, that is a phase angle of 0 degrees and the photodetection signal is stored in a predetermined address of a first frame memory 19-1 of the storage unit 18.

For all the pixels 11 of the photodetection element 12, the photodetection signals are stored in predetermined addresses in the first frame memory 19-1 as a first sampling data.

Figure 3B:
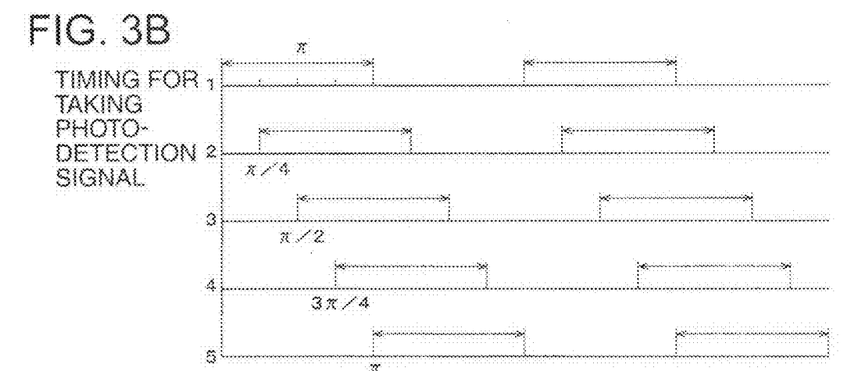

Next, with respect to a next cycle wave or to a cycle wave which reaches after predetermined time interval, as the second cycle wave of the reflected distance measuring light 31', the photodetection signals are similarly detected and accumulated. The timing for taking the photodetection signals of the next wave is after the phase angle into which one cycle wave is divided by a required number with respect to a first detection timing. For example, if one cycle is divided by eight, the timing for taking the photodetection signals with respect to second cycle wave is delayed by the phase angle of Π/4 (see FIG. 3S).

Similarly, with respect to the second cycle wave, the photodetection signal is output on the time series from the output unit 15. The photodetection signal is A/D converted by the A/D signal processing unit 17. Then, the photodetection signals for all the pixels 11 are associated with the second cycle wave and with the phase angle being Π/2, as a second sampling data and are stored in the second frame memory 19-2.

Similarly, for a third cycle wave, a fourth cycle wave and a fifth cycle wave, the photodetection signals are detected at the phase angles delayed by Π/2, 3Π/4 and Π respectively and the photodetection signals are accumulated (see FIG. 3B).

Further, similarly, for the third cycle wave, the fourth cycle wave, ... and an eighth cycle wave, the photodetection signals of all the pixels 11 are sequentially stored in the frame memories 19-3, 19-4, ... and 19-8 as a third sampling data to an eighth sampling data. The signal processing control unit 9 continues issuing the timing signals until necessary sampling data is acquired.

Referring to FIG. 3C to FIG. 3F, based on the sampling data stored in the storage unit 18, a waveform which is formed when the reflected distance measuring light 31' is received will be described.

Figure 3C:
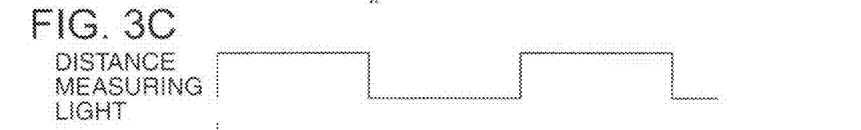
Figure 3D:
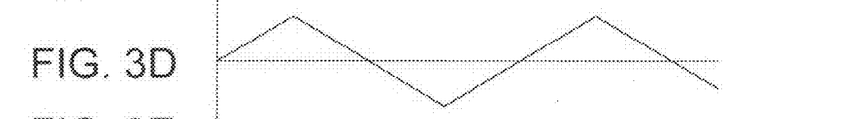

FIG. 3C illustrates a subharmonic, which is a waveform appearing when the frequency of the irradiated distance measuring light 31 is beaten down to frequency of the subharmonic. FIG. 3D illustrates a condition in case that a waveform has been changed such that an irradiated light amount might change with time based on the subharmonic.

Figure 3E:
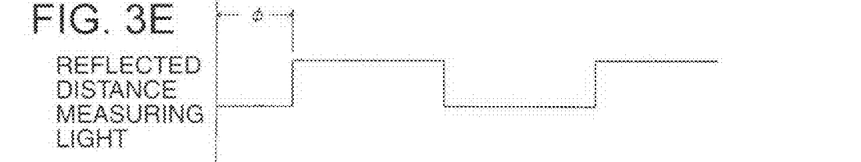

FIG. 3E illustrates a case that the frequency of the reflected distance measuring light 31' is beaten down to frequency of the subharmonic. With respect to this reflected distance measuring light 31' which has been beaten down, the photodetection control unit 13 detects and accumulates the photodetection signal.

For example, if the reflected distance measuring light 31' enters with the phase ϕ delayed by n/2 for the pixel 11a, the photodetection amount (which is detected at the timing 1 in FIG. 3B) detected about the first cycle wave is ½ of the maximum photodetection amount. Then, ½ of the maximum photodetection amount is stored in the first address of the frame memory 19-1 as the first sampling data.

The photodetection amount (which is detected at the timing 2 in FIG. 3B) detected about the second cycle wave is ¾ of the maximum photodetection amount. Then, ¾ of the maximum photodetection amount is stored in the first address of the frame memory 19-2 as the second sampling data.

The photodetection amount (which is detected at the timing 3 in FIG. 3B) detected for the third cycle wave is 1/1 of the maximum photodetection amount. Then, the maximum photodetection amount is stored in the first address of the frame memory 19-3 as the third sampling data.

Similarly, the photodetection timing is delayed by Π/4: ¾ of the maximum photodetection amount about the fourth cycle wave, ½ of the maximum photodetection amount about the fifth cycle wave, ¼ of the maximum photodetection amount about the sixth cycle wave, 0 of the photodetection amount about the seventh cycle wave, and ½ of the maximum photodetection amount about the eighth cycle wave are stored in the first addresses of the frame memories 19-4 to 19-8 as the sampling data.

Figure 3F:
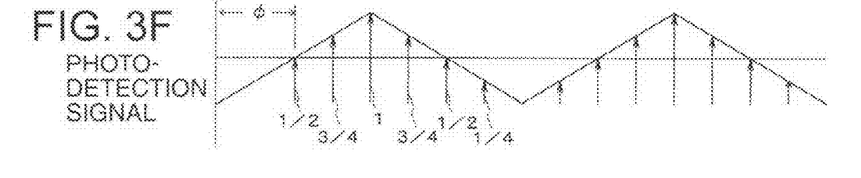

Next, the arithmetic processing unit 8 reads the sampling data stored in the first addresses of the frame memories 19-1 to 19-8 and synthesizes the waves based on the detected order of the photodetection signals, on the phases at the time of the detection and on the photodetection amount. The synthesized wave is illustrated in FIG. 3F. The wave of FIG. 3F shows that a phase ϕ delays by Π/2 with respect to the emission wave illustrated in FIG. 3D.

The arithmetic processing unit 8 calculates the time corresponding to the delay Π/2 of the phase ϕ in the emission wave and multiplies the calculated time by the velocity of light. Thus, a distance to the object to be measured 32 corresponding to the pixel 11a is obtained. That is, a distance about the pixel 11a can be measured through the acquisition of the image data of the frame memories 19 of the number corresponding to the dividing number with respect to the object to be measured 32.

Although the above description related to the pixel 11a in the first address, with respect to all the pixels 11 of the photodetection element 12, the above processing is performed in the same manner and distances about all the pixels 11 can be measured. Thus, the image of the object to be measured can be acquired and the distance measurement data about each pixel of the image can be acquired at the same time and the three-dimensional shape of the object to be measured can be measured.

Since all the pixels 11 of the photodetection element 12 receive light at the same time and the photodetection data is acquired at the same time, there is no delay in photodetection time among the pixels 11, no distortion in the acquired photographed image and no measurement error occurring among the pixels 11 in the distance measurement data.

The photodetection signals for one cycle (i.e., 2Π) are acquired in the above description. However, the photodetection signals for a half cycle (i.e., π) may be acquired and the half cycle may be synthesized from the acquired photodetection signals. The rest of the photodetection signals may be obtained through arithmetic processing. Or, since it suffices that the phase of the delay of the reflected distance measuring light 31' is detected, the photodetection signals capable of synthesizing the half cycle may be acquired.

Reducing the photodetection signals to be acquired, the number of the frame memories 19 is reduced and reducing the amount of the data processing, it is possible to reduce the cost of the electro-optical distance measuring device and to lighten a capacity of processing.

In the above description, the storage unit 18 is formed by the frame memory 19. However, it suffices that the storage unit 18 has a storage area corresponding to each of the pixels 11.

Figure 4:
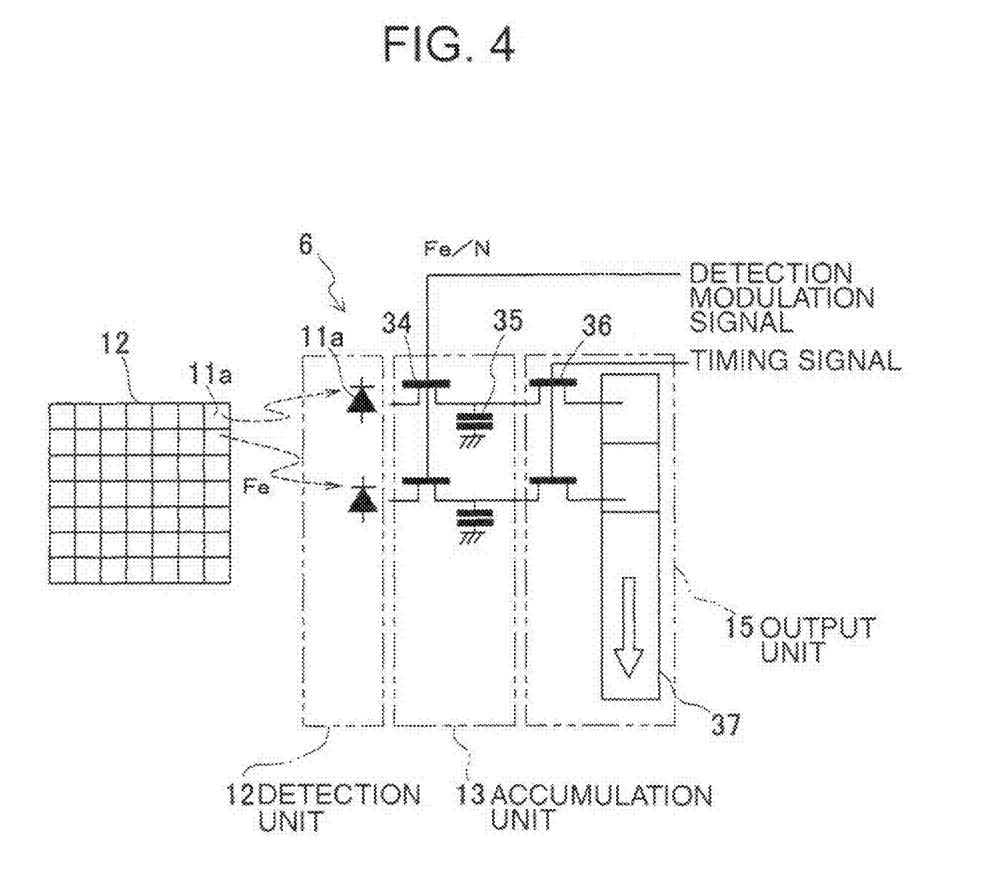
FIG. 4 is a schematic circuit diagram to snow an example of a photodetection unit employed in the first embodiment.

FIG. 4 illustrates an exemplary photodetection unit 6.

The photodetection element 12 is an array sensor having pixels 11 arranged in a matrix. The photodetection signals output from all the pixels 11 constitute the image signals of a frame.

The photodetection control unit 13 comprises a transistor 34 and a condenser 35 respectively for each pixel 11. The transistor 34 is a first switching means. The condenser 35 is a charge storage means. Switching of the transistor 34 is controlled in accordance with the detection modulation signal from the second oscillator 25 and accumulating of electric charge into the condenser 35 is controlled.

The output unit 15 comprises a transistor 36 which is a second switching means and a multiplexer 37 which is an output control means. The multiplexer 37 outputs signals on the time series which have been output from the transistor 36. Switching of the transistor 36 is controlled in accordance with the timing signal.

The frequency of the photodetection signal output from the pixels 11 is modulated (beaten down) to the necessary frequency by performing the control of an accumulating condition of the electric charge in the condenser 35 by the transistor 34 in cooperation with the control of a releasing condition of the electric charge accumulated in the condenser 35 by the transistor 34.

Figure 5:
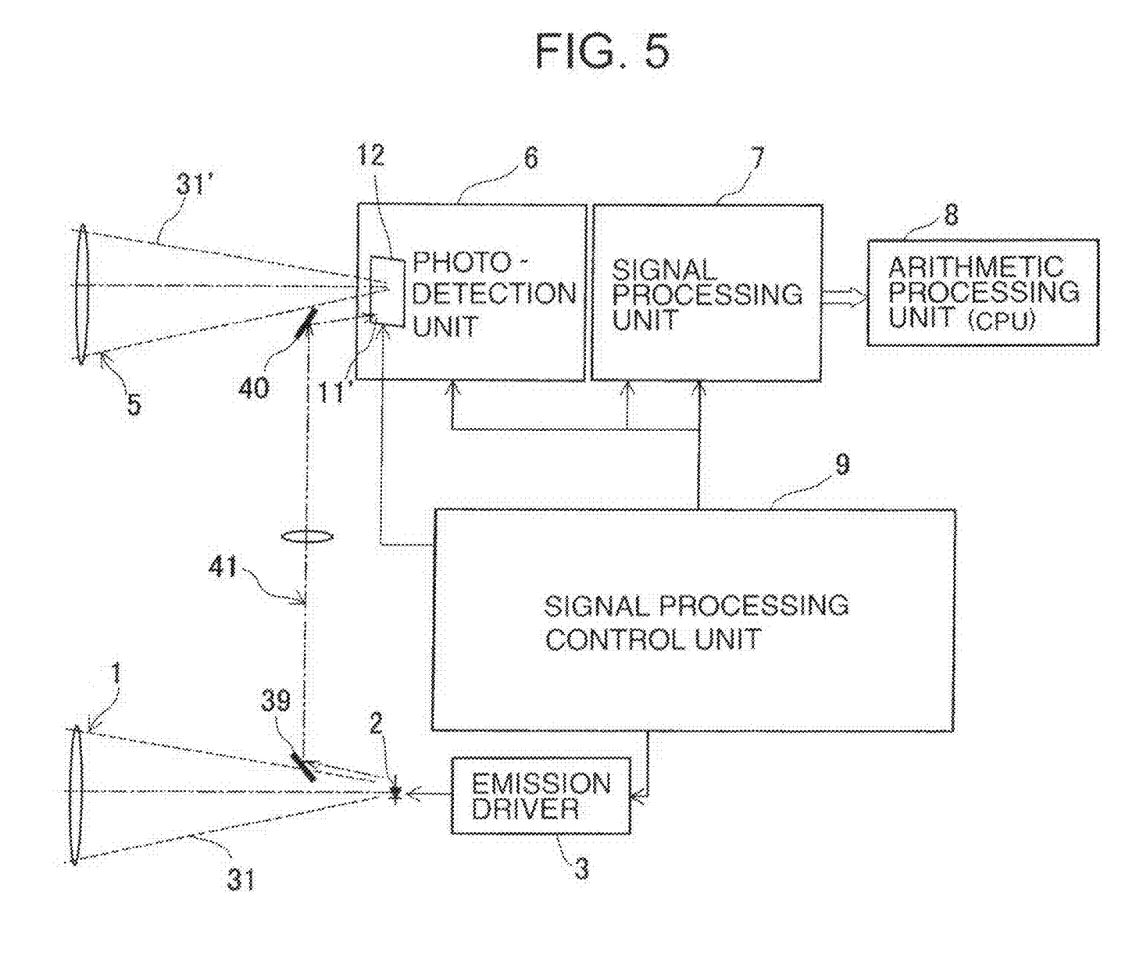
FIG. 5 is a schematic block diagram of a second embodiment.

FIG. 5 illustrates a second embodiment of the present invention. In FIG. 5, the components equivalent to components in FIG. 2 are denoted by the same reference numerals and description thereof will be omitted.

A reference optical system 41 having a first reflection means 39 and a second reflection means 40 is provided. The first reflection means 39 is provided in an optical path of the distance measuring light 31 of the projecting optical system 1. The second reflection means 40 is provided in the photodetection optical system 5. The reference optical system 41 guides a part of the distance measuring light 31 irradiated by the emitting element 2 to the photodetection optical system 5. The part of the distance measuring light 31 is entered a part of the pixels 11 (not illustrated) of the photodetection element 12 as an internal reference light. The reference optical system 41 has a known optical length.

In the second embodiment, also with respect to the photodetection signal acquired from pixels 11' which have received the internal reference light, the phase of difference frequency (i.e., the frequency beaten down) is detected as in the case of photodetection signal acquired from other pixels 11 which have received the reflected distance measuring light 31'. With respect to a phase of the difference frequency about the distance measuring light 31 is obtained from other pixels, the difference between the phase of the difference frequency and the phase of the internal reference light obtained. A distance is measured based on the obtained phase difference.

By obtaining the difference between the phase of the distance measuring light 31 and the phase of the internal reference light, drifts or the like in the photodetection element 12, the signal processing unit 7 or the signal processing control unit 9 can be offset and thus accuracy of measurement is improved.

In the above-described embodiment, the frequency of the photodetection signal is beaten down after the signal are received by the photodetection element 12. However, the frequency conversion function in the photodetection element 12 may be omitted in such manner that the emitting element 2 may emit a laser beam of which frequency is beaten down in advance.

An arrangement of the pixels 11 which constitute the photodetection element 12 may be arranged linearly or concentrically as long as the pixels 11 can be located on the photodetection surface.

What is claimed is:

1. An electro-optical distance measuring device, comprising:

a first oscillator generating a first frequency, a second oscillator generating a second frequency adjacent to said first frequency, a projection unit for modulating a distance measuring light to a frequency of said first frequency and for irradiating said modulated light toward an object to be measured;

a photodetection unit for receiving a reflected distance measuring light from said object to be measured, a signal processing unit for storing a photodetection signal from said photodetection unit, an arithmetic processing unit for calculating a distance to said object to be measured based on said photodetection signal stored in said signal processing unit, and a signal processing control unit for controlling said photodetection unit and said signal processing unit and for acquiring said photodetection signal in order to calculate said distance for each pixel, wherein said photodetection unit comprises a plurality of pixels arranged in a predetermined arrangement and an output unit being provided corresponding to each of said pixels, for accumulating said photodetection signal from each of said pixels as a difference frequency signal based on said second frequency, for detecting a photodetection amount of said photodetection signal corresponding to one division among divisions to which one cycle is divided by predetermined number and for outputting, a detection result on said time series, wherein said signal processing unit has a storage unit for storing said detection result in correspondence with each of said pixels, wherein said signal processing control unit sequentially changes a position of the division for every cycle wave at which said photodetection amount is detected and continues detections until a detected range becomes at least for one cycle or more, and wherein said arithmetic processing unit calculates a waveform for at least one cycle wave based on the detection result of at least one cycle stored in said storage unit for each pixel, calculates the difference frequency signal of the distance measuring light based on said second frequency with respect to said irradiated distance measuring light, obtains the phase difference between both of said difference frequency signals, and calculates said distance based on said phase difference.

2. An electro-optical distance measuring device, comprising:

a first oscillator generating a first frequency, a second oscillator generating a second frequency adjacent to said first frequency, an emitting element for irradiating a modulated light with said first frequency toward an object to be measured, a photodetection unit for receiving a light reflected from said object to be measured by a plurality of pixels arranged in a predetermined arrangement, a difference frequency generator for modulating each of photodetection signals acquired from each of said plurality of pixels to said second frequency and for acquiring a difference frequency signal, which is a difference between said first frequency and said second frequency, in correspondence with each of said photodetection signals, a timing pulse generator for dividing a waveform of each of said difference frequency signals, for sequentially reading said difference frequency signals of divided positions as sampling data in accordance with an arrangement order of said pixels, for sequentially changing said reading of said divided positions for every cycle, and for repeatedly reading said divided positions for at least one cycle or more of said difference frequency signal, a photodetection control unit for obtaining said difference frequency signal based on said sampling data, and an arithmetic processing unit for calculating a distance by detecting a phase difference of the difference frequency signal between said photodetection signal and a difference frequency signal acquired based on said second frequency with respect to said modulated light with said first frequency.

3. An electro-optical distance measuring device according to claim 1 or 2, wherein said photodetection unit comprises a switch for controlling electric charge generated in said pixels or accumulation of said electric charge generated accordingly, and for modulating said photodetection signal to said second frequency.

4. An electro-optical distance measuring device according to claim 2, wherein the cycle of said difference frequency signal acquired by said difference frequency generator is set so as not to be an integral multiple of data acquisition cycle of a waveform of difference frequency, and said phase is measured according to said waveform data over a plurality of cycles of said difference frequency signal.

5. An electro-optical distance measuring device according to claim 1 or 2, further comprising a reference optical system, wherein a part of modulated light irradiating said object to be measured is guided to a part of said pixels of said photodetection unit by said reference optical system, a phase of difference frequency obtained via said reference optical system is regarded as a reference phase, a phase difference between a phase of difference frequency obtained based on a photodetection signal from the rest of pixels of said photodetection unit and said reference phase is determined and a distance is calculated based on said phase difference.

* * * * *